United States Patent [19]

Parker et al.

[11] Patent Number: 5,110,454
[45] Date of Patent: May 5, 1992

[54] APPARATUS FOR RECLAIMING GRAVEL, SOIL PARTICLES AND WOOD PIECES FROM A MIXTURE OF THE SAME

[75] Inventors: Jim L. Parker, Bothell; Dave Forman, Seattle, both of Wash.

[73] Assignee: Recovery Systems Technology, Inc., Bothell, Wash.

[21] Appl. No.: 145,230

[22] Filed: Jan. 19, 1988

[51] Int. Cl.⁵ .......................... B03B 5/28; B03B 5/66
[52] U.S. Cl. ..................... 209/155; 209/173; 209/17
[58] Field of Search ............... 209/155, 156, 157, 173, 209/172.5, 172, 17

[56] References Cited

U.S. PATENT DOCUMENTS

| | | |
|---|---|---|
| 556,111 | 3/1896 | Talbot . |
| 573,981 | 12/1896 | Jones et al. . |
| 1,429,987 | 9/1922 | Weber ............................. 209/17 X |
| 1,757,103 | 5/1930 | Voigt . |
| 2,196,451 | 4/1940 | Holzer . |
| 2,578,808 | 12/1951 | Johnson et al. . |
| 2,764,289 | 9/1956 | Scheid . |
| 3,367,495 | 2/1968 | Lea et al. . |
| 3,701,565 | 10/1972 | Gutterman et al. . |
| 3,822,015 | 7/1974 | Hsieh et al. . |
| 3,969,192 | 7/1976 | Struck . |
| 4,015,366 | 4/1977 | Hall, III .......................... 209/173 X |
| 4,036,440 | 7/1977 | Mäkilä et al. . |
| 4,055,488 | 10/1977 | Siri et al. . |
| 4,161,443 | 7/1979 | Glover .............................. 209/157 |
| 4,169,787 | 10/1979 | Gunnerson ......................... 209/173 |
| 4,225,424 | 9/1980 | Patzlaff . |
| 4,375,264 | 3/1983 | Porter . |

FOREIGN PATENT DOCUMENTS

| | | | |
|---|---|---|---|
| 218353 | of 1924 | United Kingdom ................ | 209/156 |
| 612075 | 11/1948 | United Kingdom ................ | 209/155 |

Primary Examiner—Donald T. Hajec
Attorney, Agent, or Firm—Delbert J. Barnard

[57] ABSTRACT

A mixture of rock, soil particles and wood pieces (10') is introduced into a water tank (34) generally between a manifold (64) for a plurality of jet nozzles (62) and a vane or baffle (66) towards which the nozzles (62) discharge streams of water. Buoyant and nonbuoyant wood pieces (14) are moved by currents produced by jet streams issuing from the nozzles (62) towards and over the baffle (66) onto a wood piece conveyor (150) which removes the wood pieces (14) out from the water tank (34). Rocks (16) from the mixture drop down onto a rock receiving portion (82) of a rock conveyor (82, 84) which collects the rock (14) and removes it out from the water tank (34). Soil particles (18) from the mixture are washed off from the rock (16) and wood pieces (14) and settle to the bottom of the tank (34). A drag chain conveyor (160) moves accumulated soil particle mud out from the bottom of the chamber (34). The water in the chamber (34) overflows first into a first settling chamber (52) and then into a second settling chamber (54). A pump (174) pumps the water from the tank (54) back to the manifold (64).

31 Claims, 9 Drawing Sheets

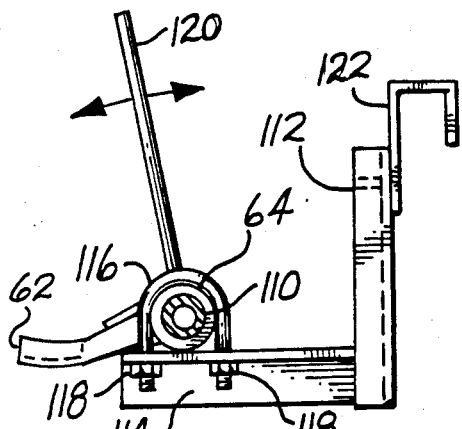
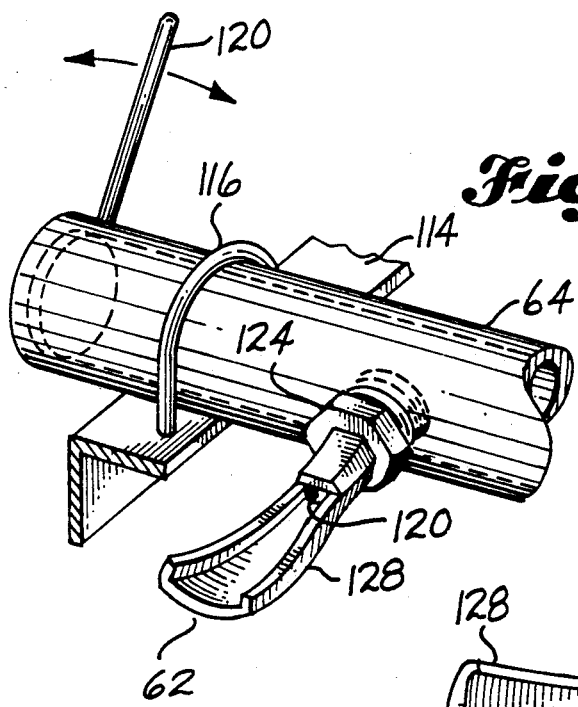
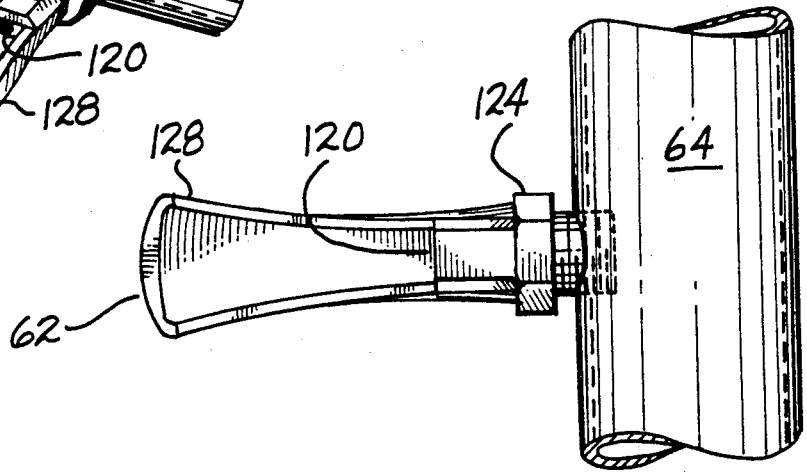

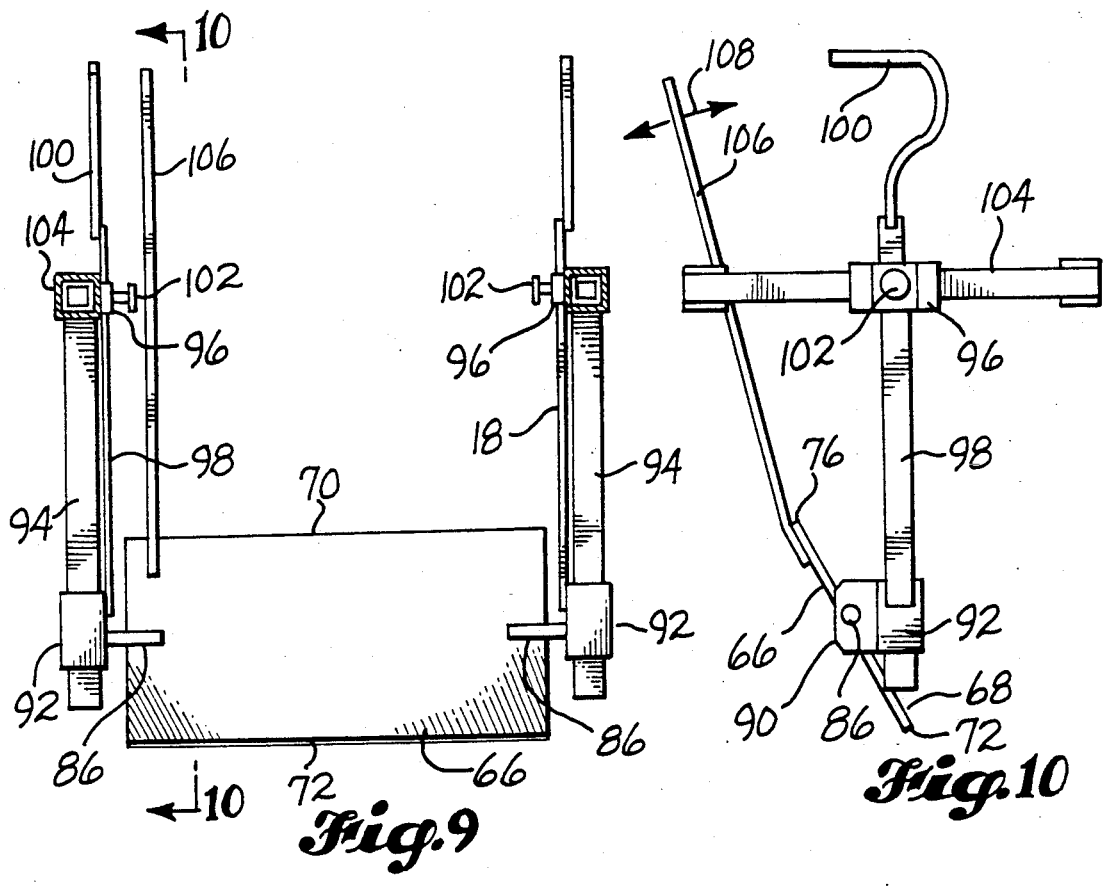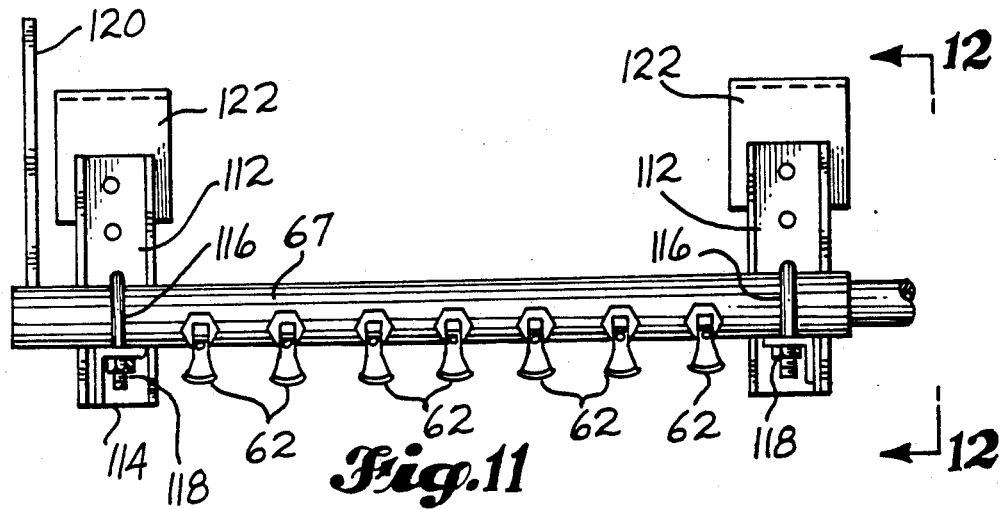

APPARATUS FOR RECLAIMING GRAVEL, SOIL PARTICLES AND WOOD PIECES FROM A MIXTURE OF THE SAME

DESCRIPTION

1. Technical Field

The present invention relates to apparatus for dividing up a mixture of rock, soil particles and wood pieces into its separate components, enabling the rock to be recovered for reuse (e.g. as gravel), the soil particles to be recovered for reuse (e.g. in top soil), and the wood pieces to be recovered for reuse (e.g. as a ground cover material).

2. Background Art

It is known to haul gravel in and place it on roads leading to and from sawmills and on the ground surfaces surrounding the sawmills. The ground surrounding sawmills and the roads are usually in the open. They become soft and muddy during the rainy seasons and it is necessary to bring in gravel in order to provide a bed on which vehicles can be driven. The gravel becomes mixed with the mud and, over a period of time, sawdust, wood particles, wood and bark chunks all become mixed together with the gravel and mud. Periodically, it becomes necessary to remove the mixture from around the mill, and from the roads, and to bring in new gravel to establish a new firm bed for the vehicles.

Until recently, it has been common practice to dump the removed material onto land that is not in use, or to incorporate it into landfill. This has not been a satisfactory manner of disposing of the material. The wood pieces decompose and in the process produce gases which are both flammable and detrimental to the atmosphere. Also, this manner of disposing of the material is a waste because all of the components of the mixture have commercial value. Any recovered rock can again be used as gravel, for example. Recovered soil particles can be used in topsoil. Recovered wood pieces can be used to manufacture ground cover of the type used on flower beds.

In recent years, attempts have been made to separate mixtures of wood pieces, rock and soil particles so that the components of the mixture can be reused. Disk screens have been used for separating the mixture into small particles, which are a mixture of soil particles and small wood particles, large wood chunks, and a mixture of gravel size rock and wood pieces of about the same size. Attempts have been made to separate the rock from the wood pieces by air streams and the force of gravity, with varying degrees of success.

U.S. Pat. No. 556,111, granted Mar. 10, 1896 to Reginald S. Talbot relates to a process and apparatus for separating clear wood chips of a type used in the manufacture of wood pulp from chips made wholly or principally from knotty portions of the wood. In accordance with this patent, a mixture of the two types of chips is deposited upon the surface of a body of liquid and is broken up or scattered by the use of a mechanical agitator or striker. This causes the chips to be separated or freed from each other. The knot-wood chips become saturated by the liquid and sink because their specific gravity is greater than the liquid. The clear wood chips are not affected by the surface saturation and therefore rise to the surface of the liquid. The clear chips are then skimmed off of the surface by the use of a conveyor. The knot-wood chips which sink are picked up by a second conveyor and removed from the body of liquid.

U.S. Pat. No. 573,981, granted Dec. 29, 1896 to Nathaniel M. Jones and Reginald Talbot also relates to an apparatus and process for separating clear wood chips from wood chips made wholly or principally from knots and knotty portions of the wood. The mixture of wood chips is delivered into a body of liquid at a region above a submerged conveyor. A rotating agitator wheel is used to force the chips into the liquid. The clear chips float and the knotty chips sink. The floating clear chips are removed from the surface by means of a conveyor. A second conveyor moves the knot wood chips and any other heavy material which may be in the mixture to a chute. The heavy material falls through the chute and at the lower end of the chute is delivered onto a conveyor which receives the chips and conveys them out from the body of liquid.

U.S. Pat. No. 2,764,289, granted Sep. 25, 1956, to Lewis J. Scheid also relates to the preparation of wood chips for use in the manufacture of wood pulp. A mixture of wood chips, slivers of bark and any associated rotten wood and dirt resulting from the chipping of wood is deposited into a soaking compartment which is substantially filled with water, preferably maintained at an elevated temperature, or with an aqueous solution of a chemical assistant, such as, for example, an alkaline material or a wetting agent. The patentee states that both the chips and slivers of bark at first float in the aqueous liquid in the soaking chamber, but as the soaking proceeds, the bark looses its buoyancy and settles to the bottom of the chamber. Any rotten wood and dirt similarly sinks to the bottom of the tank. The settled material is picked up by a conveyor and removed from the tank. The good chips float and then are skimmed off from the surface of the liquid. The tank is divided by a baffle into two compartments. One compartment functions primarily as a soaking compartment and the other as a flotation compartment. This permits the soaking and flotation steps to be carried out in a continuous manner.

U.S. Pat. No. 3,367,495, granted Feb. 6, 1968, to Norman S. Lea and James S. Brawn also relates to separating pulp wood fractions from mixtures of fine particles of wood and bark. The mixture is introduced into a tank of water or other flotation medium. A flow of liquid is used to push the wood pieces into the water. The good wood rises to the surface and is carried out of the tank by a flow of water from the tank over a lip. Bark, dirt, compression wood and knots sink to the bottom of the tank and are collected by a conveyor which is operated to remove them from the tank.

U.S. Pat. No. 3,822,015, granted Jul. 2, 1974, to Jack Jui-Chang Hsieh, John F. Cline and Harry A. Kornberg, relates to a method and apparatus for separating a mixture of objects according to the density of the individual objects. Numerous examples of items to be separated are given. One is a mixture of bark materials and wood chips. The mixture is introduced into the body of liquid within a tank. The heavy material immediately sinks and is picked up and removed by an elevated conveyor. The remaining materials are carried by the liquid to a zone into which air has been introduced for the purpose of decreasing the effective density of the liquid. Materials which have a specific gravity less than the liquid alone, but exceeding the specific gravity of the air-water mixture, sink in this region of the tank. Remaining materials having a specific gravity less than the specific gravity of the air-water mixture remain afloat and are carried by flotation to a conveyor which picks them up from the surface and removes them from the tank. The materials which sink in the mixture of air and water eventually move on to another zone of water. In this zone they regain their positive buoyancy and are moved to the water surface. These materials are then removed by skimming or by water flow across a weir.

U.S. Pat. No. 4,036,440 granted Jul. 19, 1977, to Eino Makila, Unto Virtanen and Kyosti Savinainen, relates to a method and apparatus for making wood chips for paper pulp manufacture from waste wood. In one stage of the process, crushed material is delivered into a washer in which earth, sand, stones and bark materials are separated. Strong water jets are employed to make the washing more effective and to promote the detaching of bark from the wood. The water jets create, in the washer tank, a flow of a controllable strength which is directed at a slant toward an outlet end of the tank. The flow entrains heavy crushed wood fragments which would tend to sink with the sand and rock. Earth, sand, stones and bark sink in the washer and are removed and discarded as rejects. The heavy wood material is moved by the flow to a separate outlet from the wash tank and is recovered.

U.S. Pat. No. 4,055,488, granted Oct. 25, 1977, to Joseph J. Siri and John P. Knapp, relates to a method and apparatus for salvaging wood pieces from mixed demolition material or debris comprising floatable wood particles and sinkable pieces of concrete, metal, etc. The mixture is introduced into a tank. The floatable material is pushed to a floatable-material conveyor at one end of the tank. The sinkable material drops onto a cleated conveyor which moves along the bottom of the tank. An agitator is moved back and forth along the length of the tank. The agitator contacts the upper portion of the liquid in the tank and breaks up any floating pile of a relatively heterogeneous floatable and sinkable component.

It is an object of the present invention to provide apparatus for relatively rapidly and inexpensively separating a mixture of wood pieces, rock and soil particles into its component parts, and cleaning and recovering all of these components for reuse.

DISCLOSURE OF THE INVENTION

It is an object of the invention to provide apparatus for producing clean wood pieces, clean rock and a topsoil component from waste material from a sawmill or the like.

It is also an object of the invention to produce such an apparatus which utilizes a small size separator and recirculates water used in the separation process (for reasons of economy and also for minimizing the need for water disposal).

A material separator incorporating the invention comprises a water tank having a bottom, sidewalls and an open top. A rock conveyor is positioned in the tank. It has a rock receiving portion which is spaced above the bottom and below the surface of a body of water in the tank. The rock conveyor extends from the rock receiving portion upwardly and outwardly from the tank to a discharge end located outside of the tank. A delivery means is provided for delivering into the tank, at a location generally above the rock receiving portion of the rock conveyor, a mixture of rock, soil particles and wood pieces. A wood-piece receiving portion of a wood-piece conveyor is positioned in the tank laterally adjacent the rock receiving portion of the rock conveyor. The wood-piece conveyor extends from the wood-piece receiving portion upwardly and outwardly from the tank to a discharge end located outside of the tank. The tank includes water jet means below the water level for discharging water streams which are directed to cause a flow pattern in the water for moving both buoyant and nonbuoyant wood pieces out from the mixture and influencing them toward and onto the wood-piece receiving portion of the wood-piece conveyor. The water streams move the wood pieces but not the rock due to the greater density of the rock. The rock drops downwardly through the water onto the rock receiving portion of the rock conveyor. The tank includes means for influencing soil particles from the mixture to settle at a bottom location in the tank. A mud conveyor is provided which extends from the bottom location upwardly and outwardly from the tank to a discharge end located on the side of the tank.

In accordance with an aspect of the invention, a baffle means is provided in the water at a location spaced laterally from the water jet means in a direction towards which the water jet streams extend. The delivery means for the mixture is positioned to deliver the mixture into the water at a location which is horizontally between the water jet means and the baffle means. The baffle means is vertically positioned in the water such that the wood pieces move over the baffle means on their way to the wood piece conveyor. The baffle means includes a lower boundary which is spaced above the rock receiving portion of the rock conveyor so that a water passage exists between the baffle means and the rock receiving portion. The water jets in effect pump the water in the tank surrounding them and it is necessary for water to flow from other regions of the tank back to the regions from where water has been removed. One of the flow paths is the passageway defined vertically between the baffle means and the rock receiving portion of the rock conveyor.

In preferred form, the rock conveyor extends in a direction substantially perpendicular to the direction of water stream discharge from the water jet means. The wood-piece conveyor extends in substantially the same direction as the water stream discharge. The means for influencing soil particles from the mixture to settle at a bottom location in the tank comprises a wall portion in the tank which slopes towards the bottom location. A region of the sloping wall portion extends upwardly from the bottom location to the top of the tank. A mud conveyor is provided in the form of an endless drag chain conveyor having a lower run which extends across the bottom location and then up the sloping wall. The wood piece conveyor comprises an endless foraminous belt having an upper run and a sloping wall spaced below the upper run. Soil particles are washed off of the wood pieces as the wood piece conveyor moves the wood pieces through the water. These soil particles fall down through the upper run of the conveyor onto the sloping wall. The sloping wall delivers the soil particles back into the tank. The mud conveyor extends in the same direction as the rock conveyor and is positioned alongside of the rock conveyor.

Also in preferred form, the water jet means comprises a plurality of spaced apart nozzles which are directed to create substantially parallel streams of water. Each nozzle has an inlet which is connected to a common water delivery means, in water receiving communication with the interior of the manifold. The manifold is mounted for rotation about a longitudinal axis, for adjusting the discharge attitude of the nozzles.

Preferably, also, the baffle means comprises a vane having a longitudinal axis. The vane is mounted for rotation about the axis. The vane is further mounted for adjustment both vertically and horizontally towards and away from the water jet nozzles.

In accordance with an aspect of the invention, water in the tank overflows through weirs in a wall between the tank and an adjacent settling tank. The water then overflows from the settling tank through weirs leading into a second settling tank. The two settling tanks are provided to clean the water. Water from a clean water zone of the second settlement tank is pumped to the common manifold for the water jet nozzles.

In accordance with an aspect of the invention, the wood pieces are recovered for use. For example, they may be used for making ground cover of the type used in flower beds, or as a fuel, or as a pulp source in the manufacture of products from pulp, or any other use for wood products. The larger size wood pieces may be ground up, if necessary, to produce proper sized particles for ground cover use. The soil particles are admixed to topsoil. The rock is recovered for use as gravel. The larger pieces may be crushed. Proper sized gravel may be reused on ground surfaces at lumber mills.

In accordance with an aspect of the invention, the material is first screened for the purpose of removing from it the large wood chunks. The remainder of the mixture is then screened to remove the loose soil particles and small wood particles. The portion of the mixture too large to pass through the screen is delivered into the separator tank to be separated in the manner described. Preferably, the initial screening is performed by use of rotating disk screens such as, for example, disclosed by U.S. Pat. No. 4,452,694, granted Jun. 5, 1984, to Elmer Christensen and Frank J. Steffes. This technique is per se old but its use with the other steps of the process produces a total process which is both efficient and economical. Other features, objects, and advantages of the invention will be apparent from the description of the best mode of the invention.

BRIEF DESCRIPTION OF THE DRAWING

In the drawing, like reference characters are used to designate like parts throughout the several views, and:

FIG. 7 is a pictorial view of one of the water nozzles and a portion of a manifold to which it is connected;

FIG. 8 is a top plan view of the water nozzle shown by FIG. 6;

FIG. 9 is an elevational view of an adjustable baffle;

FIG. 10 is a sectional view taken along line 10—10 of FIG. 9;

FIG. 11 is a plan view of the water nozzle assembly;

FIG. 12 is an end elevational view taken from line 12—12 of FIG. 11;

BEST MODE FOR CARRYING OUT THE INVENTION

Figure 1:
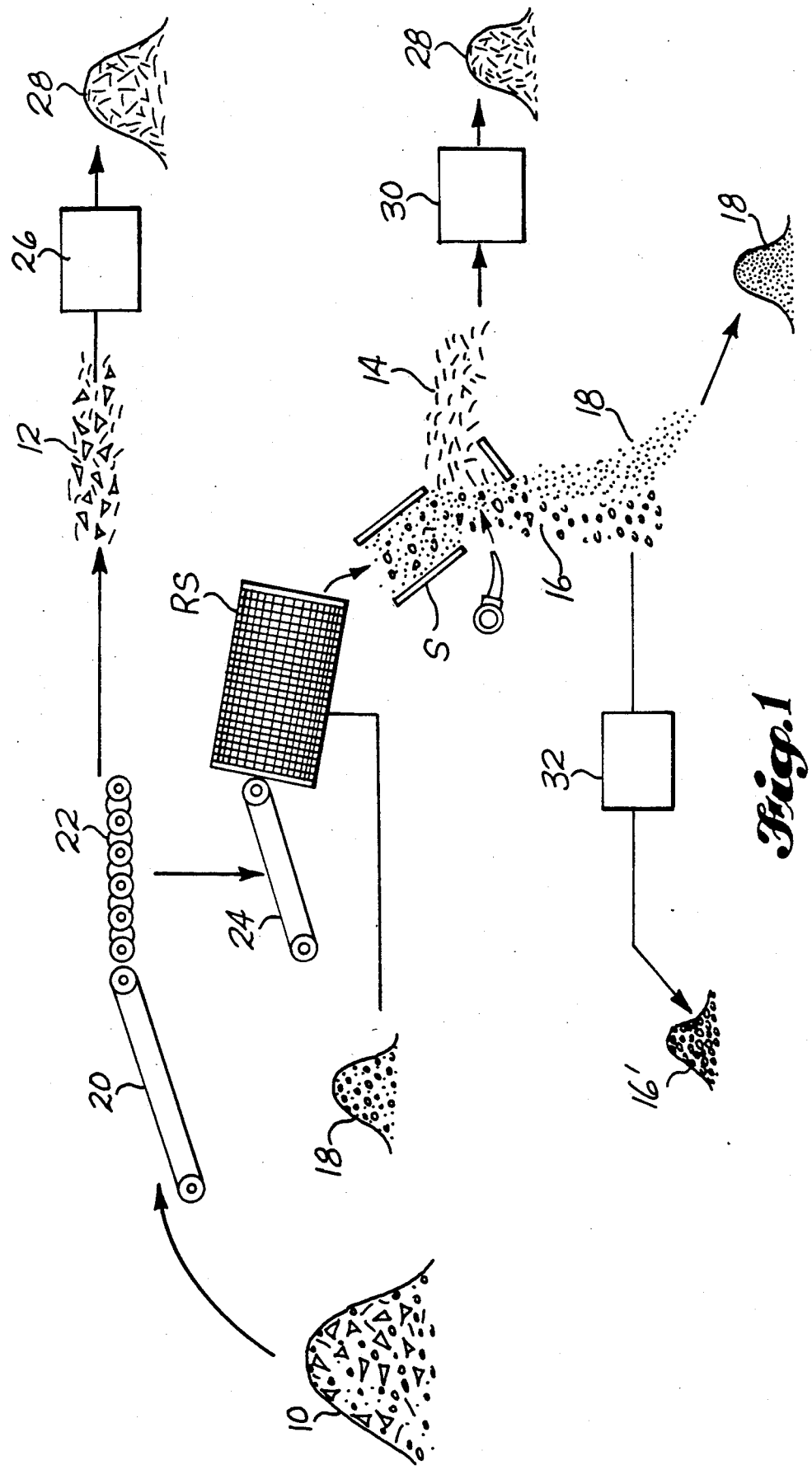
FIG. 1 is a schematic view of an overall process embodying my invention.

Referring to FIG. 1, the numeral 10 designates a pile of waste material comprising large wood chunks 12, smaller wood pieces 14, rock 16, and small soil particles 18. The soil particles 18 comprise sand, dirt, and wood particles of about the same size.

The mixture 10 is preferably first loaded onto a conveyor 20 which delivers it to disk screens 22. Disk screen section 22 screens out the rock and wood pieces of similar size to the rock (e.g. six inch and below). The large wood chunks 12 and any other material above a particular size are moved on. The wood chunks 12 may be introduced into a grinder 26 and ground up into wood particles 28 of a size suitable for garden ground cover (commonly referred to in the Pacific Northwest as "beauty bark"). Of course, other uses may be found for the wood chunks. They may be used as fuel, for particle wood products, etc.

The mixture 10' which passes through the screen 22 and falls onto conveyor 24 and is introduced into a rotary screen RS or the like. The small particles 18 (e.g. ¾ inch and smaller) pass through the screen RS and become, or are added to, topsoil, are put into landfill, or are put to some other use. The larger material is introduced into a separator S. The separator S separates it into its component parts which are rock 16, wood pieces 14 and soil particles 18. The soil particles 18 are particles which have adhered to the rock and wood pieces and for that reason were not removed by the rotary screen RS. In the separator S they are washed off of the rock and wood pieces as a part of the separation process.

The wood pieces 14 are removed from the separator and may be passed through a grinder 30 to make some more of the ground cover 28, or more small size particles for some other use. The rock 16 may be screened to remove the gravel. The larger pieces of rock 16 may be crushed at 32 and then added back to the gravel 161. Or, the rock 16 may be taken as removed and put into a landfill.

As previously stated, one commercial use of the product 28 made from the wood pieces 14 is as a ground cover in gardens. It may be admixed to freshly ground pieces of bark so that the ground cover is not composed completely of the reclaimed wood material. One use of the soil particles is as a component of topsoil. It may be used in the manufacture of topsoil or admixed to previously manufactured topsoil, or to natural topsoil. The reclaimed rock 16 may be used again on the roads and ground surfaces around a saw mill, to provide a base on which workmen can walk and vehicles can be driven. Or, it can be appropriately sized and used as aggregate in asphalt or Portland cement concrete, for example, or may simply be used as landfill material.

Figure 2:
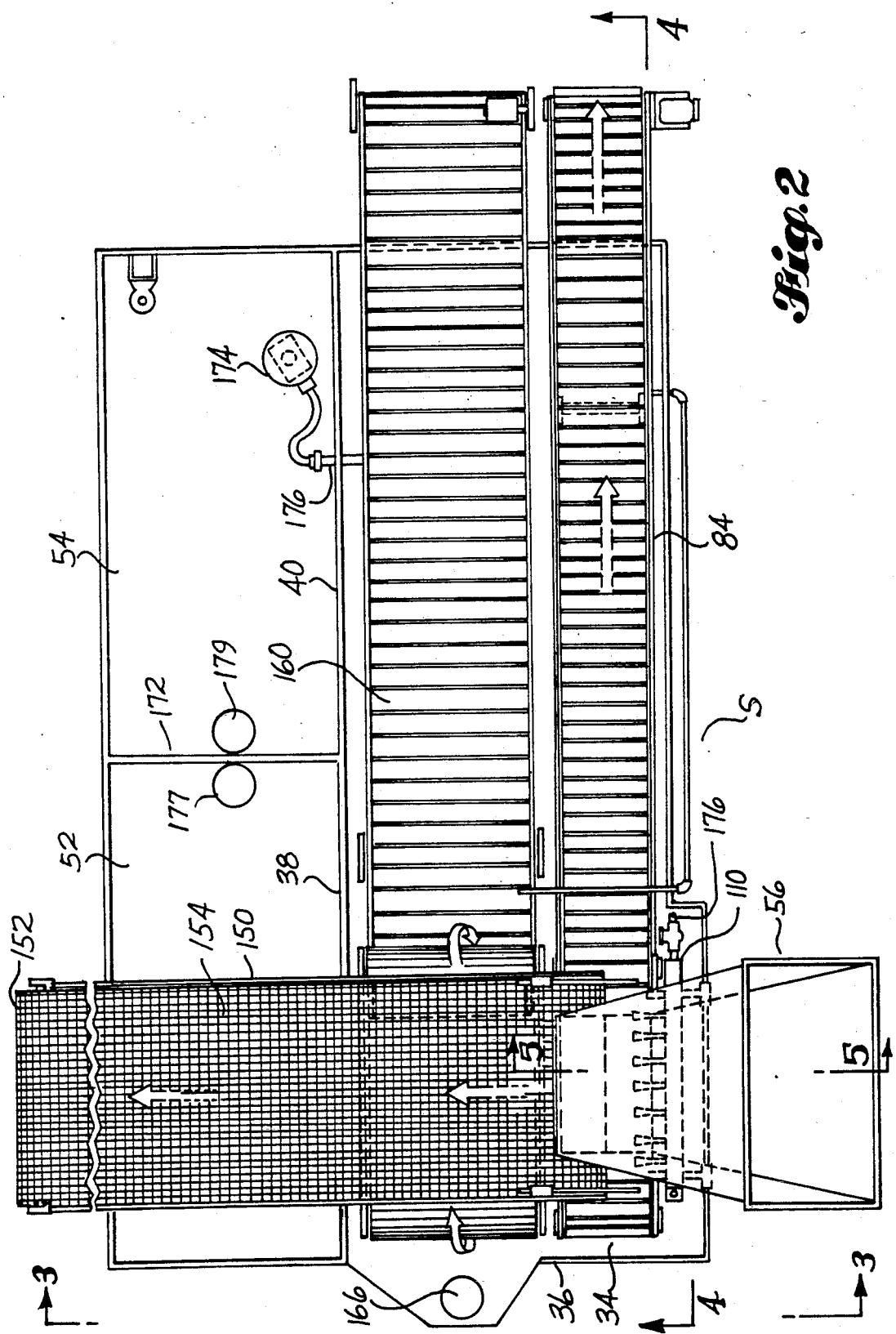
FIG. 2 is a top plan view of an embodiment of a material separator portion of my invention.
Figure 3:
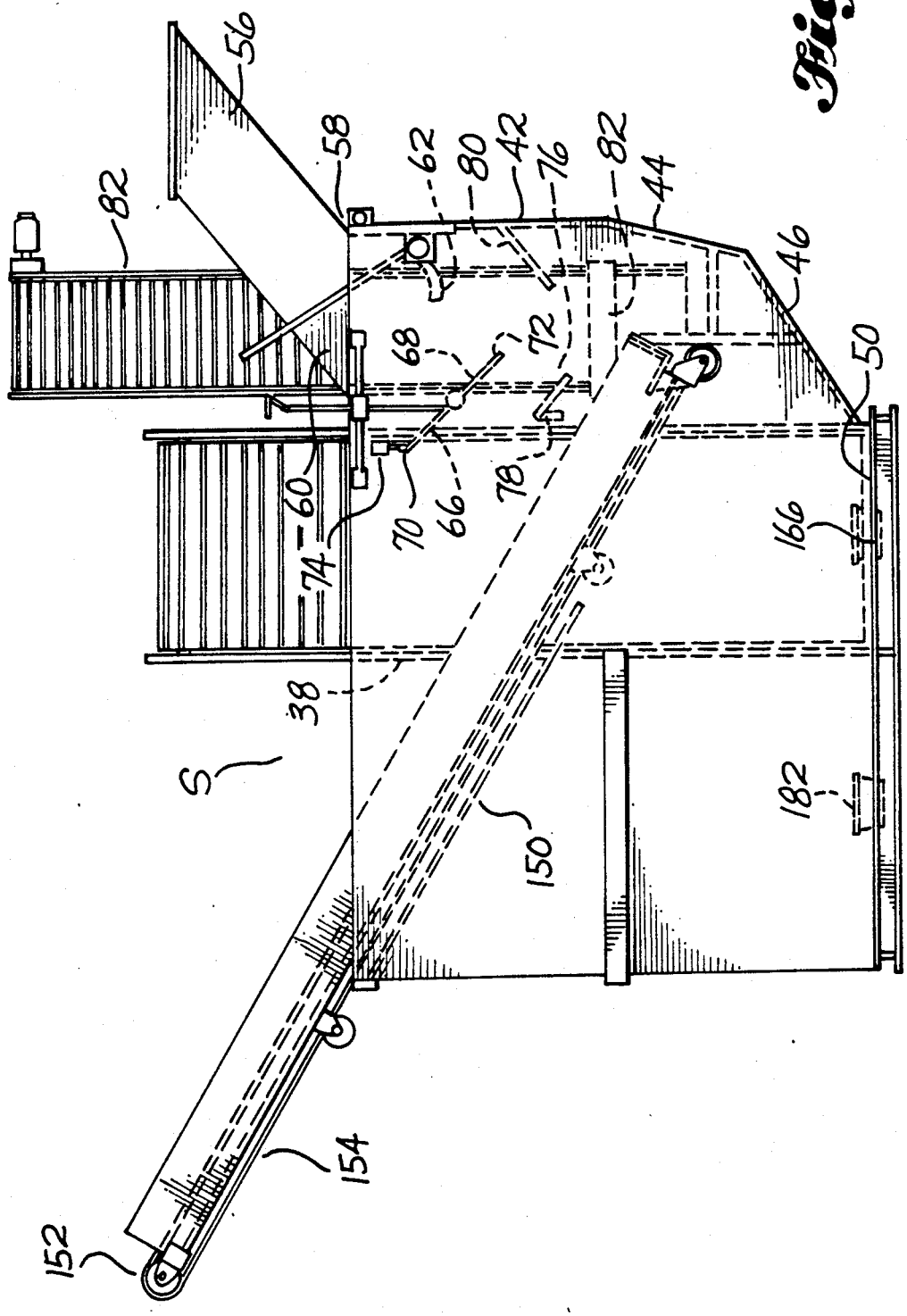
FIG. 3 is an end elevational view of the material separator, taken substantially along line 3—3 of FIG. 2.

The separator S of the invention will now be described. Referring to FIG. 2 and 3, the separator S comprises a water tank 34 having sidewalls 36, 38, 40, 42, 44, 46, 48, a bottom 50 and an open top. Wall 36 is at one end of the tank 34. Wall 38 is a common wall between tank 34 and a second tank 52. Wall 40 is a common wall between tank 34 and a third tank 54. Wall 42 is an upper outside sidewall portion. Walls 44, 46, 48 all slope inwardly and function to influence small particles in the water to settle at a bottom region which includes the bottom 50.

Figure 4:
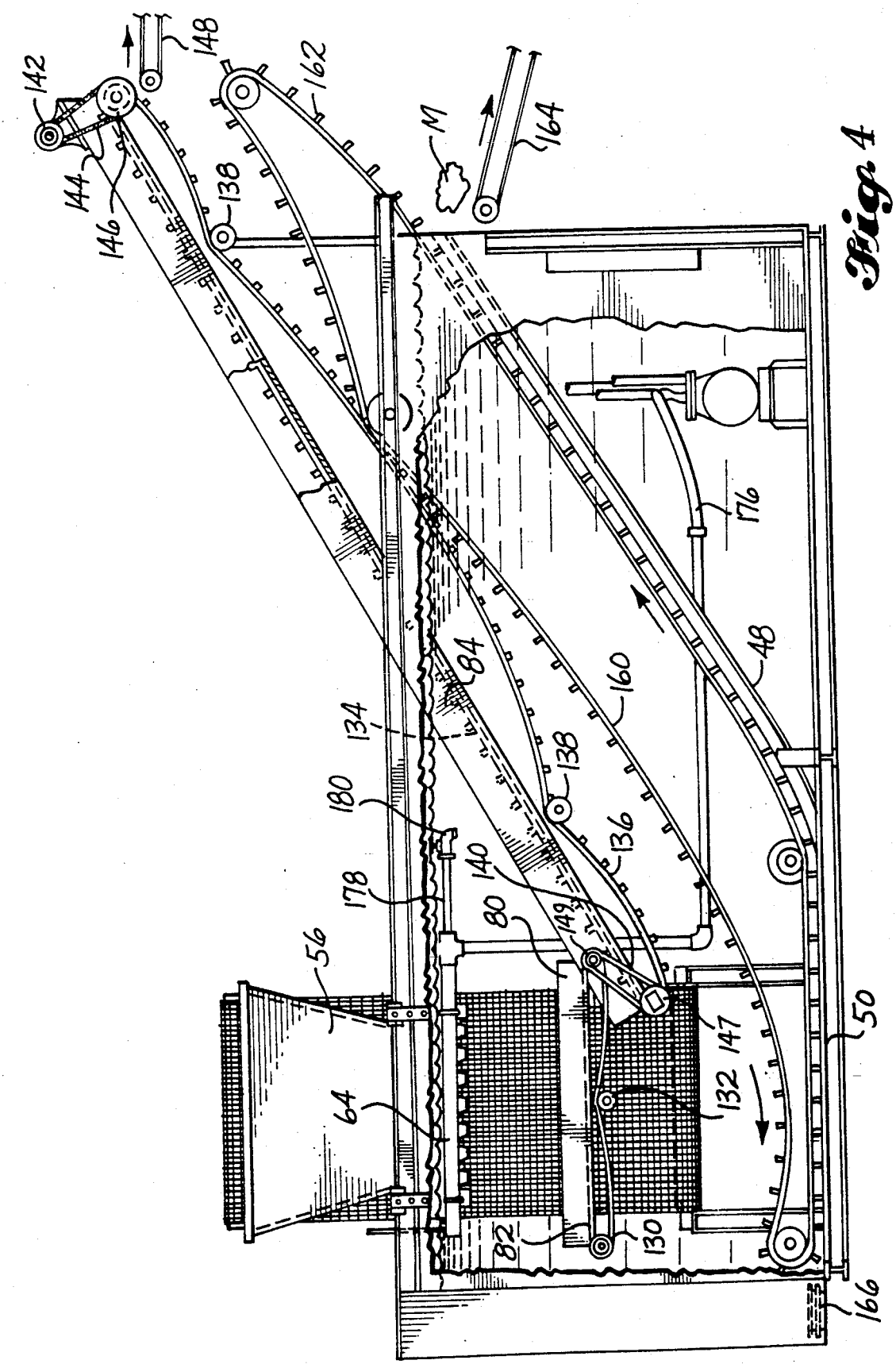
FIG. 4 is a side elevational view taken substantially along line 4—4 of FIG. 2, with a foreground wall portion cut away.
Figure 5:
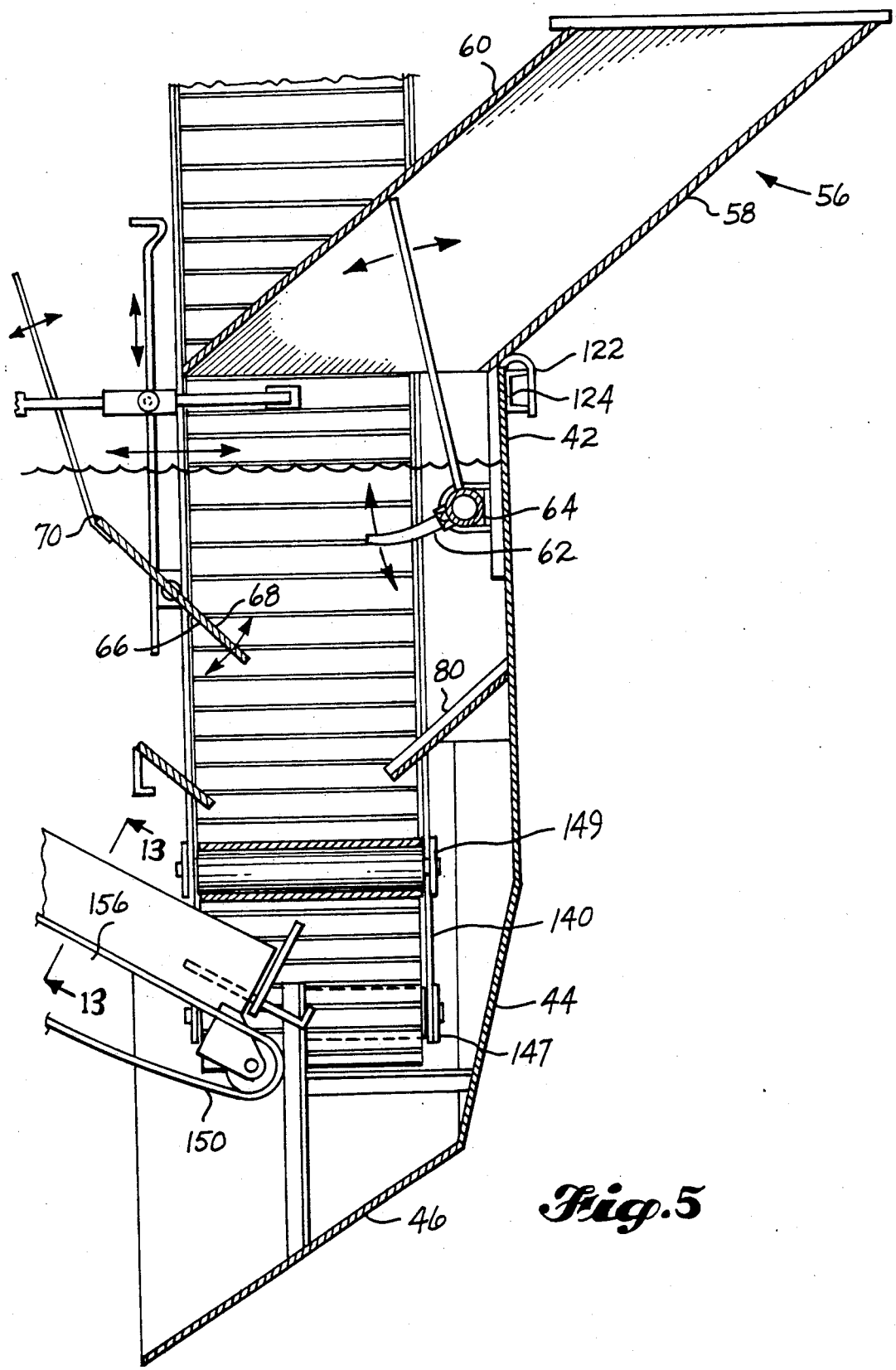
FIG. 5 is an enlarged scale view taken at the entry portion of the material separator, with some parts shown in elevation, said view being taken substantially along line 5—5 of FIG. 2.

Referring to FIGS. 3-5, the separator S includes a delivery chute 56 through which the mixture 10' is delivered into the body of water that is in the tank 34. Delivery chute 56 may have a boundary 58 where it joins wall 42 and an opposite boundary 60. A plurality of water jet nozzles 62 are positioned in the water below a discharge opening in a delivery chute 56 which is between the boundaries 58, 60. The nozzles 62 are parallel, are spaced apart a distance that is preferably at least as wide as the discharge opening, and the nozzles 62 are all connected to a common manifold 64. The nozzles 62 deliver parallel water streams which extend from wall 42 towards the wall 38. A baffle means, shown in the form of a vane 66, is spaced from the nozzles 62. Vane 66 is shown to be elongated in a direction extending perpendicular to the nozzles 62 and parallel to the manifold 64. In this direction it has a length which is preferably greater than the width of the discharge opening. Vane 66 is shown to present a surface 68 to the water nozzles 62 which slopes downwardly as it extends from an upper boundary 70, to a lower boundary 72. The upper boundary 70 is submerged and a water passageway 74 exists above the upper boundary 68. A water passageway 76 also exists below the lower boundary 72.

Figure 6:
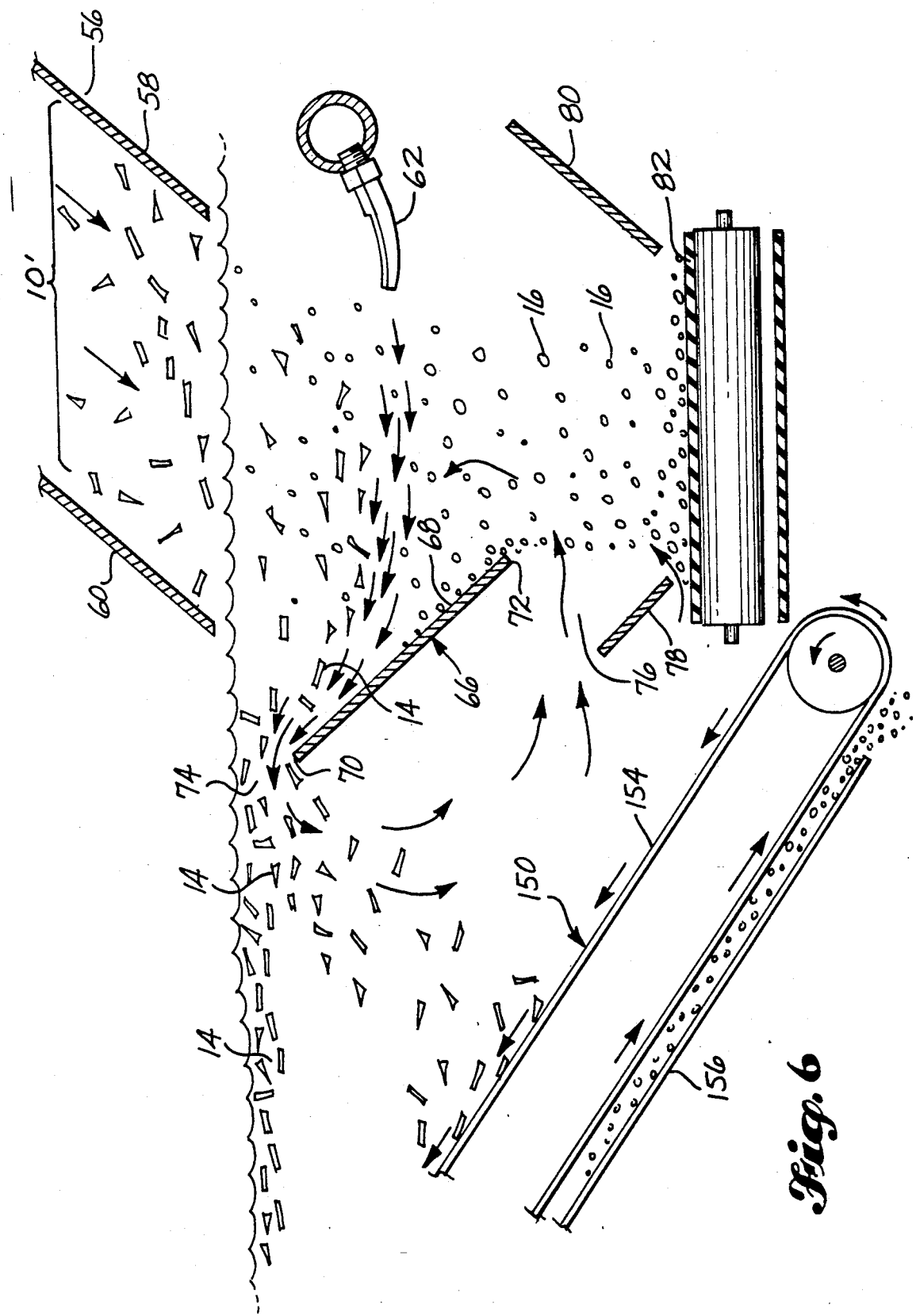
FIG. 6 is an enlarged scale view of the upper portion of FIG. 4, with some detail omitted.

As can be shown by FIG. 6, material 10' is dropped by the delivery chute 56, into the water vertically above the nozzles 62, the vane 66 and the space which lies between the nozzles 62 and the vane 66. The wood pieces 14 comprise both buoyant and nonbuoyant wood pieces. In a still pool of water, the nonbuoyant wood pieces would want to sink. However, in the tank 34, the moving water streams produced by the nozzles 62, and induced currents in the body of water, act to hold up the nonbuoyant wood pieces, and move them together with the buoyant pieces, towards and then over the vane 66. The denser rock 16 is not so influenced rather falls vertically downwardly and is guided by walls 78, 80 onto a rock receiving portion 82 of a rock conveyor 84. Walls 78, 80 are rectangular in shape and are elongated in a direction parallel to the direction of movement of the rock receiving portion 82 of the rock conveyor 84. The walls 78, 80 slope downwardly and inwardly towards each other from their top edges down to their bottom edges. Together they form a hopper which gathers the rock and directs it onto the rock receiving portion 82.

The water streams issuing from the nozzles 62 entrain water in the tank that is above and below the streams and thus create a situation in which the entrained water must be replaced by water from other regions of the tank. It is believed that water which flows under the vane 66 and then upwardly to a region above surface 68, and below the water streams, helps buoy the nonbuoyant wood pieces. It was found that suspension of the nonbuoyant wood pieces could be established by easy adjustments of the nozzles 62 and the vane 66. These adjustments are hereinafter described in detail.

Referring to FIGS. 5, 9 and 10, the vane or baffle 66 is shown in the form of a rectangular plate having trunnions 86 at its ends. The trunnions 86 are in coaxial alignment generally at the longitudinal center of the vane 66. The outer ends of the trunnions 86 are received in journals 90 (FIG. 10) which are mounted on tubular carriers 92. The tubular carriers 92 slip over tubular frame members 94 which at their upper ends are secured to tubular carriers 96. Bars 98 with handles 100 at their upper ends extend downwardly to lower connections to the tubular carriers 92. Bars 98 extend through clamp mechanisms carried by the tubular carriers 96. The clamp mechanisms include control knobs 102. When the control knobs 102 are loosened, the handles 100 can be gripped and used for moving the members 92, 98 and the vane 66 secured thereto, vertically up or down. A loosening of the clamp screws 102 also makes it possible to slide the carriers 96 back and forth along horizontal guide tubes 104. As will be evident, the vertical movement of the handles 100 will move the vane 66 up or down, i.e. adjust its position vertically within the water. Movement of the carriers 96 along the guide tubes 104 will adjust the vane 66 in position back and forth relative to the nozzles 62. When the vane 66 is properly positioned, the control knobs 102 are tightened. A control rod 106 extends upwardly from an upper portion of the vane 60 to a location spaced adjacent one of the handles 106. Control rod 106 is moved back and forth along path 108, for adjusting the angle which the vane 66 makes relative to the water streams. The face 68 of vane 66 which is directed towards the water streams slopes downwardly and towards the nozzles 62, as it extends from its upper boundary 70 to its lower boundary 72.

Referring to FIGS. 2, 7, 8, 11 and 12, a plurality of the nozzles 62 are mounted together on a common manifold 64. Manifold 64 is a section of pipe closed at one end and at its opposite end being connected to a water delivery pipe 110. The nozzles 62 have inlet portions which are secured to the manifold 64. Water flows through the pipe 110 into the manifold 64 and from the manifold 64 to and through the nozzles 62.

Manifold 64 is mounted for rotation about its longitudinal axis. In the illustrated embodiment, this is accomplished in a very simple manner. Referring to FIG. 12, vertical support member 112 is provided at each end of the manifold 64. Support member 112 is connected at its lower end to a horizontal shelf 114, shown to be constructed from a length of angle iron. U-bolts 116 extend through horizontal upper legs of the angle iron member 114. The U-bolts 116 are held in place by nuts 118 which are located below the horizontal legs of the members 114. The nuts 118 are only lightly tightened, so that when forced the manifold 64 can roll in place. A control handle 120 extends upwardly from one end of the manifold 64 and is used for rotating the manifold 64. In the illustrated embodiment, hooks 122 are provided at the upper ends of the members 112. These hooks 122 are used for simply hanging the nozzle assembly onto an upper edge portion of sidewall 42. In FIG. 5 the hooks 122 are shown hooked over an upper wall edge that is reinforced by a channel iron member 124.

The nozzles 62 are preferably of a type having an enclosed divergent portion 124, leading to a venturi 120 and then to an open divergent portion 128. The divergent portion 128 is in the nature of a channel with a lower closed wall. The end of manifold 64 opposite the water delivery pipe 110 may include a clean-out plug 65 FIG. 11).

The separator components which have just been described are prepared for use in the following manner. The water pressure in the manifold 64 is raised and lowered to control the velocity of the water streams issuing from the nozzles 62. The manifold 64 is rotated in position, and the vane 66 is adjusted in position horizontally and vertically and is rotated until the proper currents are formed in the water. The results can be observed. The various adjustments are made until it is seen that the buoyant and nonbuoyant wood pieces all flow over the top of the vane 66.

Referring to FIG. 4, the rock conveyor 82, 84 has a rock receiving portion 82 which is positioned vertically below the discharge end of the delivery chute 56. The rock receiving portion 82 extends horizontally. It is preferably an endless belt 130 and the rock drops onto the upper run of the belt. The upper run carries the rock over to an elevating section 84 of the conveyor 82, 84. It is also preferably an endless belt 134 having an upper run and a lower run 136, together with the usual guide rollers 138. In the illustrated embodiment, the rock receiving portion 82 has a lower run and a guide roller 132. The two conveyor belts 130, 134 may be connected together by a drive belt 140. This makes it possible to drive both belts by use of a single motor 142 which may be located at the discharge end of the conveyor section 84. Motor 142 is shown connected by a belt 144 to a main drive pulley 146. The main drive pulley 146 pulls upwardly on the upward run of the conveyor belt 134. Movement of this conveyor belt 134 rotates a roller 147 at the lower end of the conveyor section 84. Rotation of this roller 147 moves the belt 140 which in turn rotates a roller 149 at the discharge end of the rock receiving conveyor 82. As this roller 149 rotates, it moves the rock receiving conveyor belt 130 in a direction moving the upper run of the belt towards the elevating conveyor section 84. The rocks are discharged over the end of the upper run onto the upper run of the conveyor 134. The conveyor belt 134 is cleated. The cleats are preferably molded into the belt 134. The cleats grab the rock and prevent it from sliding back by gravity during the upward climb of the conveyor belt 134. The rock is discharged at the upper end of the conveyor belt 134 onto another conveyor 148 which carries the rock onto the next processing station.

Referring to FIG. 2, the rock conveyor 82, 84 is shown positioned along the side 42 of tank 34. Thus, the conveyor 82, 84 extends in a direction that is substantially perpendicular to the direction of material delivery into the delivery chute 56.

In the preferred embodiment, a wood piece conveyor 150 is positioned to extend perpendicular to rock conveyor 82, 84. Wood piece conveyor 150 is colinear with the material delivery chute 56. It is of a width wider than the discharge end of the delivery chute 56. It starts from a position in the water below the rock receiving conveyor 82 and extends upwardly and out of the water and the tank 34 to an elevated discharge end 152. Wood piece conveyor 150 comprises an endless conveyor belt 154 constructed from a foraminous material. A sloping wall 156 is positioned below the conveyor belt 154. Soil particles and other small particles washed from the wood pieces fall through the openings in the belt 154 and are directed by the wall 156 back into the water below the conveyor 150.

The bottom region 50 of tank 34 is positioned below the wood piece conveyor 150. Tank sidewalls 44, 46, 48 all slope towards bottom region 50. These walls influence soil particles which are in the water to settle in the bottom region 50.

In accordance with an aspect of the invention, the mud or sludge which accumulates at the bottom region 50 is removed by means of a drag chain conveyor. As shown by FIG. 2, the drag chain conveyor 160 extends parallel to rock conveyor 82, 84 and perpendicular to wood piece conveyor 150. The drag chain conveyor 160 is an endless conveyor belt on which transverse cleats 162 have been attached. The cleats are on the bottom side of the lower run of the conveyor belt. As shown by FIG. 4, during rotation of the belt the cleats 162 are moved first horizontally across the bottom region 50 and then upwardly along the inclined wall 48. The drag chain conveyor delivers the mud on to a conveyor 164 which carries it onto the next processing station. The drag chain conveyor 160 is not on all of the time. It is turned on for a period of time to remove accumulated mud. It is then turned off and stays off while more mud accumulates.

Tank 34 also includes a drainage plug 166 at one end which is removed when it is desired to thoroughly clean the tank. The plug 166 is removed, the tank is drained, and then the tank is thoroughly washed.

Figure 14:
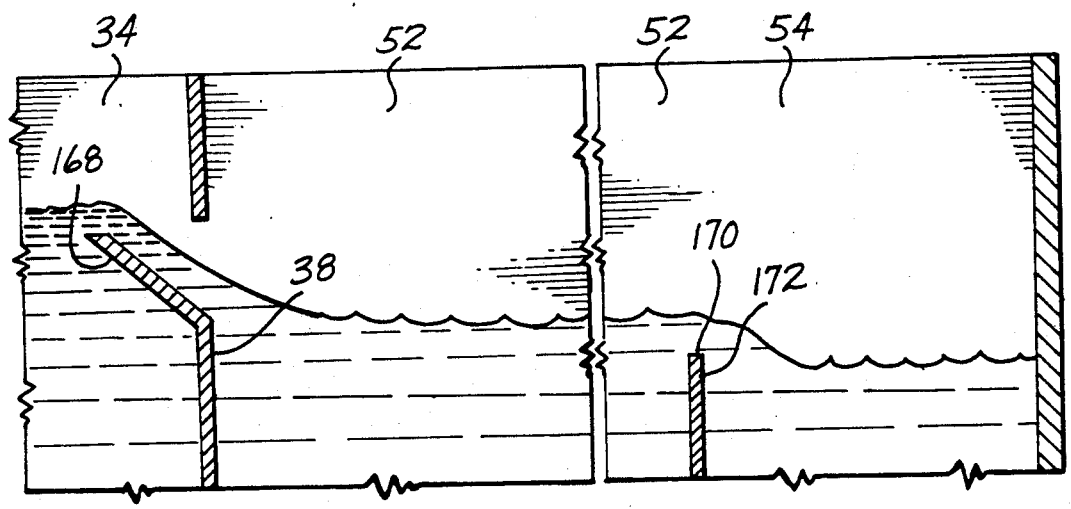
FIG. 14 is a fragmentary elevation view of the upper portion of a weir between the first and second tanks, and a weir between the second and third tanks.

In accordance with an aspect of the invention, the water used in the separator S is cleaned and reused. Referring to FIG. 14, a weir 168 is formed in the upper portion of wall 38. By way of example, the weir 168 may provide a drop in water level of about six inches from tank 34 to tank 52. A similar weir 170 is formed atop wall 172. Wall 172 is a common end wall between the tanks 52, 54. The weir 170 may provide about a six-inch drop in water level from tank 52 to tank 54. Water in tank 34 flows over the weir 168 into tank 52. Some settling occurs in tank 52. The water then flows over weir 170 into tank 54. Additional settling occurs in tank 54.

A pump 174 in a relatively clean water region of tank 54 pumps water out from tank 54 and through a pipe 176 up to the water delivery pipe 110 and manifold 64. A swivel may be provided at the inlet, to allow the manifold 64 to be rotated in position relative to the water pipe 176.

Clean-out openings 177, 179 may be provided in the bottom of tanks 52, 54. These clean-out openings are normally closed by plugs. They are moved when it is desired to drain the tanks 52, 54, for a thorough cleaning.

The use of a plurality of tanks in succession for cleaning water is per se old. However, this is an important part of the separator S. It makes it possible to separate large quantities of material with a small quantity of water. This both conserves the water and minimizes the disposal problem of wastewater. Periodically, the equipment must be cleaned. At that time, the water is dumped and the tanks are drained. Then the tanks and all equipment in them are thoroughly washed.

Figure 13:
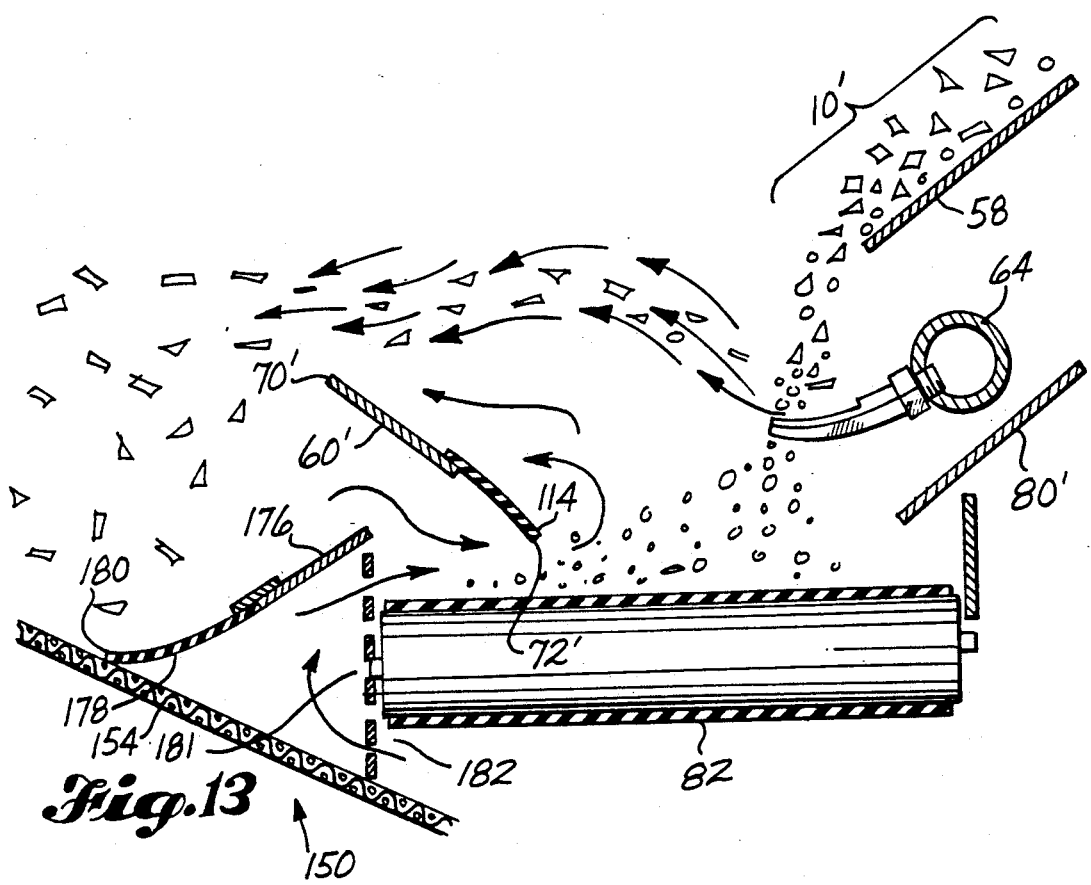
FIG. 13 is a view similar to FIG. 6, but of a modified arrangement of the parts.

After experimenting for awhile with the adjustments in position of the manifold 64 and the vane 66, a relative positioning of the various components that is shown in FIG. 13 was found to be preferred. It was discovered that the material 10' could be delivered into the separator by means of a delivery chute having a wall 58 at its bottom and short sidewalls. The vane 66' was positioned close to the upper run of the conveyor belt 154 for the wood piece conveyor 150. The vane 66' and sloping wall 80' then formed a hopper for directing the rock onto the rock receiving portion 82 of the rock conveyor 82, 84. A strip of elastomeric material was secured to extend along the lower portion of the vane 66'. This strip 174 bends downwardly in response to rock pieces 16 hitting it and may bend upwardly somewhat in response to current flow around the lower end of the vane 66'. It was decided to place a wall 176 below the vane 66' and secure to it a second strip 178 of elastomeric material. The lower edge 180 of strip 178 rests on the upper run of the conveyor belt 154. Wall 176 and strip 178 extends completely across the full width of the conveyor belt 154. It was also found desirable to place openings 181 in a support frame wall 182 for the rock receiving portion 82 of the rock conveyor 82, 84. As the jet streams from the nozzle 62 acted to induce flow towards and over the upper boundary 70' of the vane 66', water flow from below the vane 66', including from a region below wall 176, flows through the upper run of the wood conveyor belt 154, and through the openings 181 in the frame member 182, and then flows around the lower end 72' of the vane 66', to replace the water that was induced into and pumped away by the jet streams from the nozzle 62. As previously stated, it is believed that it is the flow around the lower boundary 72' which adds an upward force to the nonbuoyant wood particles, causing them to move with the buoyant wood particles over the upper boundary 70' of the vane 66' and eventually to the upper run of the conveyor 154. The elastomeric strip 180 provides a surface onto which the nonbuoyant wood pieces can fall and accumulate until they are moved upwardly and out of the tank by the conveyor belt 154.

The present invention includes both method and apparatus aspects of the entire process illustrated by FIG. 1. Although various uses of the reclaimed materials have been stated, it is to be understood that the present invention is not to be limited to any particular use of the reclaimed material. In addition, the particular conveyors and other components which have been illustrated and described can be replaced by other equipment capable of performing the same function. In some installations it may not be necessary to use some of the system that is disclosed. For example, it may not be necessary to perform the initial separation steps by use of a disk screen conveyor 22 and/or the rotating screen RS. In other words, it is contemplated that in some uses the material to be reclaimed can be, introduced directly into the separator S. It may also not be necessary to use three tanks in the separator S or, at times, it may be necessary to use more than three tanks. The particular jet nozzles that were illustrated and described were found to work very well, but it is believed that other types of jets may also be used. The various embodiments which have been illustrated and described are merely examples of the invention and the invention is not to be limited by any of the details of these examples. Rather, the invention and patent protection are to be determined by the following claims, interpreted in accordance with settled rules of patent claim interpretation, including use of the doctrine of equivalents.

What is claimed is:

1. A material separator for separating a mixture of buoyant and nonbuoyant wood pieces, rocks and soil particles into its component parts, comprising:
    a water tank having a bottom, sidewalls and an open top, said tank when in use containing a body of water having a water surface;
    a rock conveyor having a rock receiving portion in said tank spaced above the bottom and below the surface of the body of water, said rock conveyor extending from the rock receiving portion upwardly and outwardly from said tank to a discharge end located outside of the tank;
    delivery means for delivering into said tank, at a location generally above the rock receiving portion of the rock conveyor, a mixture of rock, soil particles and wood pieces;
    a wood-piece conveyor having a wood-piece receiving portion in said tank located laterally adjacent the rock receiving portion of the rock conveyor, said wood-piece conveyor extending from said wood-piece receiving portion upwardly and outwardly from the tank to a discharge end located outside of the tank;
    means in said tank, below the water surface, for causing a flow pattern in the water for moving both buoyant and nonbuoyant wood-pieces out from said mixture and influencing them towards and onto the wood-piece receiving portion of the wood-piece conveyor, while allowing rocks to drop downwardly through said water onto the rock receiving portion of the rock conveyor, said means in said tank comprising water jet means directed to discharge water streams towards said wood piece conveyor and a baffle in said water spaced horizontally from the water jet means in a direction towards which the water streams extend, said baffle sloping downwardly towards said water jet means, and said delivery means being positioned to deliver the mixture into the water at a location which is horizontally between the water jet means and said baffle, and the vertical position of the baffle is such that the wood pieces in the water move over the baffle on their way to the wood-piece conveyor, said baffle including a lower boundary spaced above the rock receiving portion of the rock conveyor, so that a water passage exists between the baffle and the rock receiving portion;
    means for influencing soil particles from the mixture to settle at a bottom location in said tank; and
    a mud conveyor extending from said bottom location upwardly and outwardly from the tank to a discharge end located outside of the tank.

2. A material separator according to claim 1, wherein the rock conveyor extends in a direction substantially perpendicular to the direction of water stream discharge from the water jet means and the wood-piece conveyor extends in substantially the same direction as the water stream discharge.

3. A material separator according to claim 1, comprising wall means on each side of the rock receiving portion of the rock conveyor, said wall means sloping inwardly and having inner edges spaced vertically above opposite side portions of the rock receiving portion of the rock conveyor, said wall means functioning to direct rocks onto said rock receiving portion of the rock conveyor.

4. A material separator according to claim 1, wherein said mud conveyor extends in the same direction as the rock conveyor and is positioned beside the rock conveyor.

5. A material separator according to claim 1, wherein the rock conveyor comprises an inclined endless belt and transverse rock holding cleats on said belt.

6. A material separator according to claim 1, wherein the means for influencing soil particles from the mixture to settle at a bottom location in said tank comprises a wall portion of the tank which slopes towards said bottom location.

7. A material separator according to claim 6, wherein a said sloping wall portion extends upwardly from said bottom location to the top of the tank and said mud conveyor comprises an endless drag chain conveyor having a lower run which extends along said bottom location and then up said sloping wall.

8. A material separator according to claim 1, wherein said wood-piece conveyor comprises an endless foraminous belt having an upper run and a sloping wall spaced below said upper run, for delivering soil particles which fall through said upper run onto the sloping wall towards a lower portion of said tank, and said means for influencing soil particles from the mixture to settle at a bottom location in said tank including said sloping wall.

9. A material separator according to claim 8, wherein the rock conveyor extends in a direction substantially perpendicular to the direction of water stream discharge from the water jet means, and the wood piece conveyor extends in substantially the same direction as the water stream discharge, and said bottom location in the tank is in general alignment with the delivery means, with the rock receiving portion of the rock conveyor, and with the wood-piece conveyor, and said bottom location being vertically below a submerged portion of the wood-piece conveyor.

10. A material separator according to claim 1, further comprising settling tank means for cleaning the water including wall means equipped with overflow weirs through which water from the water tank flows to a clean water zone in the settling tank means, and a pump for pumping water from the clean water zone to said water jet means.

11. A material separator according to claim 10, wherein said settling tank means comprises a second tank separated from the water tank by a wall which includes overflow weirs and a third tank separated from the second tank by a wall which includes overflow weirs, and wherein said clean water zone is in said third tank.

12. A material separator according to claim 1, wherein said water jet means comprises a plurality of spaced apart nozzles directed to create substantially parallel streams of water, a common water delivery manifold for said nozzle, and each nozzle having an inlet end connected to the manifold in water receiving communication with the interior of the manifold.

13. A material separator according to claim 12, further comprising means mounting the manifold for rotation about an axis extending longitudinally of the manifold, for adjusting the discharge attitude of the nozzles.

14. A material separator according to claim 12, wherein the rock conveyor extends in a direction substantially perpendicular to the direction of water stream discharge from the nozzles and the wood-piece conveyor extends in substantially the same direction as the water stream discharge.

15. A material separator according to claim 12, wherein the wood-piece conveyor comprises an endless foraminous belt having an upward wall and a sloping wall spaced below said upper run, for delivering soil particles which falls through said upper run onto the sloping wall towards a lower portion of said tank, and wherein said means for influencing soil particles from the mixture to settle at the bottom location of the tank includes said sloping wall spaced below the upper run of the wood-piece conveyor belt.

16. A material separator according to claim 1, wherein said water jet means comprises a plurality of spaced apart nozzles directed to create substantially parallel streams of water, and said baffle is elongated in a direction extending substantially perpendicular to the streams of water.

17. A material separator according to claim 16, further comprising a common manifold for the water jet nozzles which has a longitudinal axis extending substantially parallel to the direction of travel of the rock receiving portion of the rock conveyor, and said water jet nozzles include inlet portions mounting them to the manifold, and for receiving water from the interior of the manifold, and means for rotating the manifold in position for the purpose of changing the discharge angle of the water jet nozzles.

18. A material separator according to claim 16, wherein the baffle is a vane, and means for vertically adjusting the vane in position.

19. A material separator according to claim 18, further comprising a common manifold for the water jet nozzles which has a longitudinal axis extending substantially parallel to the direction of travel of the rock receiving portion of the rock conveyor, and said water jet nozzles include inlet portions mounting them to the manifold, and for receiving water from the interior of the manifold, and means for rotating the manifold in position for the purpose of changing the discharge angle of the water jet nozzles.

20. A material separator according to claim 16, wherein the baffle is a vane having a longitudinal axis, and means mounting said vane for rotation about said axis.

21. A material separator according to claim 20, further comprising means for adjusting the vane in position, horizontally towards and away from the water jet nozzles.

22. A material separator according to claim 20, further comprising a common manifold for the water jet nozzles which has a longitudinal axis extending substantially parallel to the direction of travel of the rock receiving portion of the rock conveyor, and said water jet nozzles include inlet portions mounting them to the manifold, and for receiving water from the interior of the manifold, and means for rotating the manifold in position for the purpose of changing the discharge angle of the water jet nozzles.

23. A material separator according to claim 20, further comprising means for vertically adjusting the vane in position.

24. A material separator according to claim 23, further comprising a common manifold for the water jet nozzles which has a longitudinal axis extending substantially parallel to the direction of travel of the rock receiving portion of the rock conveyor, and said water jet nozzles include inlet portions mounting them to the manifold, and for receiving water from the interior of the manifold, and means for rotating the manifold in position for the purpose of changing the discharge angle of the water jet nozzles.

25. A material separator according to claim 23, further comprising means for adjusting the vane in position, horizontally towards and away from the water jet nozzles.

26. A material separator according to claim 25, further comprising a common manifold for the water jet nozzles which has a longitudinal axis extending substantially parallel to the direction of travel of the rock receiving portion of the rock conveyor, and said water jet nozzles include inlet portions mounting them to the manifold, and for receiving water from the interior of the manifold, and means for rotating the manifold in position for the purpose of changing the discharge angle of the water jet nozzles.

27. A material separator for separating a mixture of buoyant and nonbuoyant wood pieces, rocks and soil particles into its component parts, comprising:
a water tank having sidewalls and a bottom, said tank when in use containing a body of water having a water surface;
a plurality of spaced apart water stream discharging nozzles submerged in the tank below the water surface and directed to discharge substantially parallel streams of water away from a sidewall portion of the tank;
a submerged vane in the tank spaced from the nozzles, said vane having an upper edge, a lower edge and a side surface directed towards the nozzles, said side surface sloping downwardly and toward the nozzles from its upper edge to its lower edge;
means for dropping into said tank, between the nozzles and the vane, a mixture of rocks, soil particles and both buoyant and nonbuoyant wood pieces;
said nozzles being positioned to, with the vane, produce currents in the body of water which will push both buoyant and nonbuoyant wood pieces over the top of the vane while allowing the rock to drop downwardly from the space between the nozzles and the vane.

28. A material separator according to claim 27, comprising a common manifold for the nozzles, and wherein each nozzle has an inlet end connected to the manifold for receiving water therefrom, and said separator includes means mounting the manifold for rotation to in that manner adjust the discharge attitude of the nozzles.

29. A material separator according to claim 27, wherein said vane has a longitudinal axis extending perpendicular of the water streams, and said separator includes means for rotating the vane in position about said axis.

30. A material separator according to claim 27, comprising means for adjusting the vertical position of the vane within the body of water.

31. A material separator according to claim 27, comprising means for adjusting the position of the vane in the body of water, horizontally towards and away from the nozzles.

* * * * *